US007295763B1

(12) United States Patent
Cooper et al.

(10) Patent No.: US 7,295,763 B1
(45) Date of Patent: Nov. 13, 2007

(54) STORAGE MEDIUM FOR DIGITAL TELEVISION SIGNAL

(75) Inventors: Jeffrey Allen Cooper, Indianapolis, IN (US); Thomas Edward Horlander, Indianapolis, IN (US); Michael Dillon Rich, Fishers, IN (US); Mark Alan Schultz, Carmel, IN (US); Timothy Forrest Settle, Alpharetta, GA (US)

(73) Assignee: Thomson Licensing, Boulogne (FR)

( * ) Notice: Subject to any disclaimer, the term of this patent is extended or adjusted under 35 U.S.C. 154(b) by 0 days.

(21) Appl. No.: 09/830,900

(22) PCT Filed: Nov. 12, 1999

(86) PCT No.: PCT/US99/26991

§ 371 (c)(1),
(2), (4) Date: May 2, 2001

(87) PCT Pub. No.: WO00/30358

PCT Pub. Date: May 25, 2000

Related U.S. Application Data

(60) Provisional application No. 60/108,233, filed on Nov. 13, 1998.

(51) Int. Cl.
*H04N 5/91* (2006.01)
(52) U.S. Cl. .................... 386/112; 386/125; 386/126
(58) Field of Classification Search ............... 386/46, 386/95, 98, 111, 112, 125, 126, 68
See application file for complete search history.

(56) References Cited

U.S. PATENT DOCUMENTS 5,742,361 A * 4/1998 Nakase et al. ......... 375/240.26
5,751,356 A * 5/1998 Suzuki ................. 375/240.01
5,801,781 A * 9/1998 Hiroshima et al. ......... 348/441
5,991,503 A * 11/1999 Miyasaka et al. ........... 386/111
6,366,731 B1 * 4/2002 Na et al. ....................... 386/83
6,597,860 B2 * 7/2003 Song et al. .................... 386/68
6,618,396 B1 * 9/2003 Kondo et al. ................ 370/474

FOREIGN PATENT DOCUMENTS

EP          600467        6/1994
EP          838926        4/1998

* cited by examiner

Primary Examiner—Huy Nguyen
(74) Attorney, Agent, or Firm—Joseph J. Laks; Robert D. Shedd; Paul P. Kiel

(57) ABSTRACT

A data storage element comprising a substrate and a data track disposed on the substrate, the data track comprising a plurality of data sectors, each of the data sectors being formatted in accordance with a first digital data standard and comprised of a control data portion and a payload data portion, each of the payload portions including a plurality of data packets formatted in accordance with a digital television standard. In particular, the data packs correspond to program stream packs specified in the DVD standard and the data packets correspond to transport packets specified in the ATSC standard. The present storage element enables the data stored thereon to be read by a conventional DVD front end and provided to an ATSC receiver without processing the contents of the transport packets. Therefore, the present invention allows ATSC data to be stored on a DVD disc and to be provided in a manner that can fully realize the display capabilities of the ATSC receiver. The present invention is particularly advantageous in HDTV applications.

34 Claims, 7 Drawing Sheets

STORAGE MEDIUM FOR DIGITAL TELEVISION SIGNAL

This application claims the benefit of U.S. provisional application Ser. No. 60/108,233 filed Nov. 13, 1998, which is hereby incorporated herein by reference, and which claims the benefit under 35 U.S.C. § 365 of International Application PCT/US99/26991, filed Nov. 12, 1999, which was published in accordance with PCT Article 21(2) on May 25, 2000 in English and International Application PCT/US99/26925, filed Nov. 12, 1999, which was published in accordance with PCT Article 21(2) on May 25, 2000 in English.

BACKGROUND OF THE INVENTION

1. Field of the Invention

The present invention relates to an apparatus and a method for providing a digital data stream associated with a video program, and in particular, an apparatus and a method for reading a digital data stream from a storage element having data stored according to a first standard, for example the DVD standard, and providing a digital data stream formatted in accordance with a digital television standard, for example the ATSC standard.

2. Related Art

Video signal processing systems that utilize storage media having digitally compressed video and audio information recorded thereon can give a user a vast number of options for controlling presentation of a program, or a video title, stored on such a media. One such system that is gaining rapid popularity comprises a video disc player adapted to process information stored in accordance with the digital video disc (DVD) specification. The information on a DVD formatted disc is recorded as discrete packets of data, in accordance with the DVD specification, wherein designated data packets carry information associated with various data streams, such as alternative video angles, audio tracks, sub-picture streams, etc. A video disc player reading a DVD formatted disc may be controlled to display or present certain packets of data and skip over others. Using digital processing techniques, the DVD system can use the digitally compressed data stored on the disc to seamlessly provide multiple variations of a program on a single disc to suit the preferences of the viewer.

FIG. 1 illustrates a conventional DVD player that provides an output signal to a television receiver adapted to process analog video signals. Generally, disc player 24 comprises motor and pickup assembly 26 which, under the control of servo processor 29, spins the disc and reads the information stored thereon. Preamp 27 and DVD data processing unit 28 translate the electrical pulses from motor and pickup assembly 26 into digital data that can be further processed by digital audio/video decoder unit 30. DVD data processing unit 28 typically performs functions such as demodulation, error correction and descrambling of the raw data read from the disc so that the data is in a suitable format for decoder unit 30.

Decoder unit 30 receives the demodulated, error corrected and descrambled data, processes the data, and provides the appropriate video and audio signals to a suitable display unit. Decoder unit 30 comprises data stream demultiplexer 32 which demultiplexes the data from data processing unit 28 into a plurality of separate data streams, including a video stream, an audio stream and a sub-picture stream, and provides the data streams to their respective data decoders. Video decoder 31 receives the video stream, decompresses the data, decodes the video data and provides a video signal to mixer 33. Sub-picture decoder 34 receives the sub-picture stream and provides data to on-screen display (OSD) control 35 which provides OSD video signals to mixer 33. The combined video signal from mixer 33 is provided to NTSC/PAL encoder 42 which generates a video signal that conforms to the appropriate analog video signal standard and provides the signal to a television receiver. Audio decoder 36 receives the audio streams from data stream demultiplexer 32 and provides the appropriate audio signals to an audio system. Microcontroller 40, which is coupled to system buffer 50, controls the operation of the various components of disc player 24. Typically, microcontroller 40 is also configured to control various access features of disc player 24. Microcontroller 40 may be embodied in an integrate circuit, including, but not limited to STI 5520, manufactured by SGS Thomson.

Also, digital television (DTV) standards have recently been developed to transmit and process high quality video, audio and ancillary data. Systems that utilize a digital television apparatus adapted to receive and process digital video signals offer a number of advantages over systems that utilize analog signals, including, improved picture resolution, ability to dynamically reallocate channel capacity among various data streams, and capability to add data streams to provide open ended extensibility of future services. One such DTV system is described by the ATSC standard A/53, 1995 (the "ATSC standard"), which specifies a system for transmitting data over a single 6 MHz channel. The ATSC standard utilizes a fixed length packet transport stream that is defined and optimized for DTV applications.

However, conventional DVD players are generally designed to operate with analog television systems and therefore may not be able to fully utilize the advantages associated with a DTV system. In particular, the resolution of a picture based on an analog signal may be significantly lower than the resolution of a picture based on a DTV compliant signal, for example an ATSC compliant signal. For example, an NTSC signal is formatted to display 525 interlaced lines at a rate of 30 frames per second. The ATSC standard allows for a number of higher resolution formats, including, 1080 lines at 1920 samples per line, 720 lines at 1280 samples per line and 483 lines at 720 samples per line. Although a DTV apparatus may also include components for processing and displaying analog signals, the resolution of the resulting picture will not match the picture resolution from a higher resolution digital format. As such, the NTSC or PAL compliant output signals of conventional DVD players can not fully realize the high definition (HD) display capabilities that may be possible in a DTV system. This represents a significant deficiency of conventional DVD players, especially in view of the growing trend toward digital television systems.

Therefore, what is needed is an apparatus and a method for storing data in a manner that allows the data to be easily read using conventional DVD player pick up components and may be easily modified for processing in a digital television apparatus.

In particular, what is needed is an apparatus and a method for storing data in a manner that includes features of the DVD standard which allows the data to be easily read using conventional DVD player pick up components and includes features of a digital television standard which allows the data to be easily modified for processing in a digital television receiver.

Also, what is needed is an apparatus for reading a digital data stream stored on a storage element, which includes features of the DVD standard and features of a digital television standard, and providing an output signal that conforms to the digital television standard.

EP 0600467A2 generally discloses a method for recording ATV signals onto the tracks of a video tape, wherein an application ID is recorded onto a timing sector of each track. The application ID stipulates a data structure for the data stored on the track. As such, different types of data can be recorded onto a particular video tape.

EP 0838926A2 discloses an apparatus and method for transmitting a pack of 2048 byte data pack using a digital interface according to the IEEE 1394 standard. In this connection, a 4 byte time stamp and 124 bytes of padding data are added to the 2048 byte pack, and then divided into a number of fractions that is a multiple of 2 thereby converting into a number of data blocks equal to the number of fractions. Each data block has a byte length of a multiple of 4. A CIP header and the like are added to a predetermined number of the data blocks to form a packet.

SUMMARY OF THE INVENTION

The present invention relates to an apparatus and a method for providing digital video signals associated with a video program from a data storage element, wherein data is stored on the data storage element in accordance with features of a first digital data standard, for example the DVD standard, and the digital video signal is formatted in accordance with a digital television standard, for example the ATSC standard.

The present invention is a data storage element comprising a substrate, and a data track disposed on the substrate, the data track comprising a plurality of data packs, each of the data packs being formatted in accordance with a first digital data standard and comprised of a control data portion and a payload data portion, each of the payload portions including a plurality of data packets formatted in accordance with a digital television standard. In an advantageous embodiment, each data pack corresponds to a program stream pack in accordance with the DVD standard and the plurality of data packets correspond to ATSC compliant transport packets. In a further advantageous embodiment, each control data portion of each data sector includes a null_packet_indicator field including data indicative of the total number of data packets associated with the respective data sector and whether each data packet is a transport packet or a null packet.

BRIEF DESCRIPTION OF THE DRAWINGS

The invention will be described with reference to the accompanying drawings, wherein.

DETAILED DESCRIPTION

A notable feature of the present invention is the manner in which data is stored on a data storage element, in particular a HD DVD disc, as described below. In a HD DVD disc in accordance with the present invention, data packets in accordance with a DTV standard, for example the ATSC standard, are mapped onto the program stream structure of a DVD disc. In an exemplary embodiment, ATSC compliant transport packets are mapped onto the data payload portion of data packs formatted in accordance with the DVD standard. Such mapping allows a HD DVD disc having DTV compliant data streams stored thereon to be read by a conventional DVD front end portion, i.e., the portions that reads the data from the disc and provides an error corrected bit stream suitable for processing. Also, as discussed further below, mapping the data in this manner allows a HD DVD disc player according to the present invention to provide a DTV compliant output signal to a digital television apparatus with little modification of the data read from the HD DVD disc.

Figure 3:
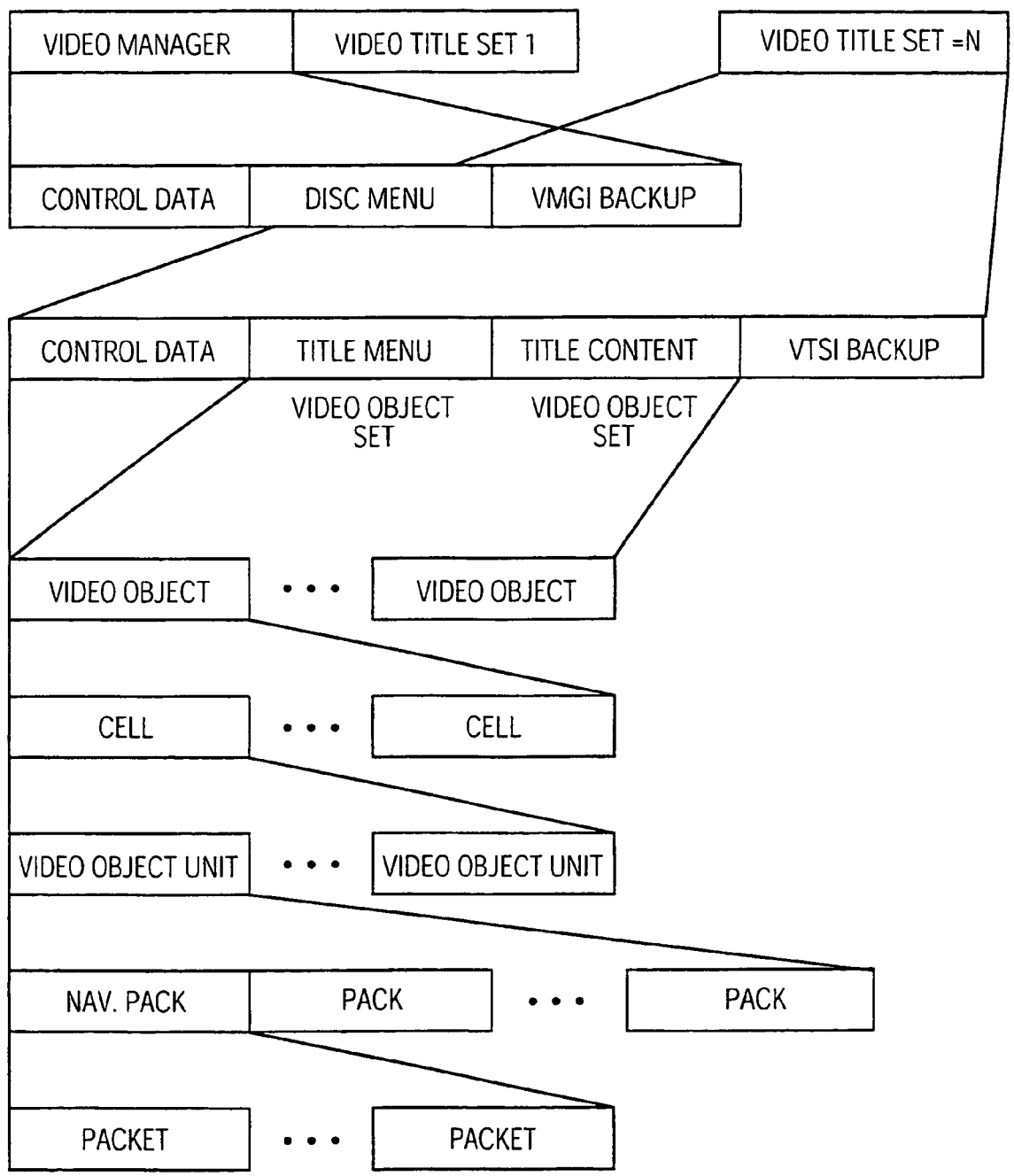
FIG. 3 is a diagram of a data structure in accordance with the DVD format.

FIG. 3 illustrates the structure of the program data and control data in accordance with the DVD specification. The data structure is hierarchical, wherein each data block is divided up into component data blocks, which are further divided into smaller component data blocks. Each video title set, which corresponds to a designated program unit, for example, a movie or an episode of a television show, is comprised of video object sets, which of which comprises a plurality of video objects.

Each video object is comprised of a plurality of cells, which may be considered a data unit for presentation having a plurality of data unit types, such as video, audio, subpicture, etc, and corresponds to a program segment. Each cell is in turn comprised of a plurality of video object units (VOBUs). Each VOBU is comprised of a navigation pack (NAV_PACK) and a plurality of packs, which are comprised of a plurality of packets. A VOBU generally corresponds to an MPEG-2 Group of Pictures (GOP) with an associated control data structure, the NAV_PACK. The NAV_PACK of each VOBU contains information such as sector addresses of VOBUs relative to the current one (both forwards and backwards in temporal presentation order), and the amount of elapsed time in cell presentation which corresponds to the current VOBU.

Figure 4:
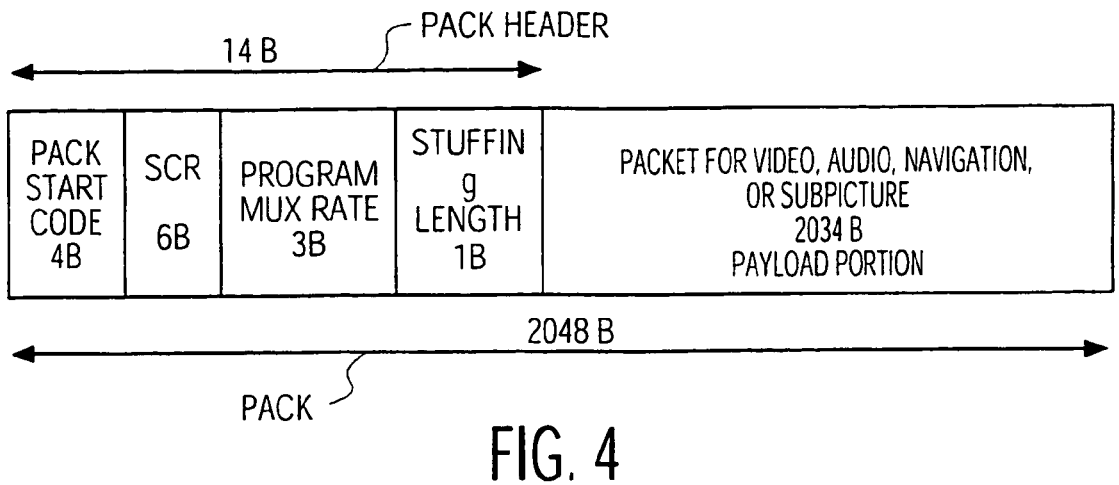
FIG. 4 is a diagram of a data pack in accordance with the DVD format.

A pack, also referred to as a sector, is the smallest addressable block of data on a DVD disc and is 2048 bytes in length. The format of a pack according to the DVD specification is shown in FIG. 4, wherein the pack comprises a 14 byte pack header followed by a payload portion. The pack header is identical in structure to that defined in ISO/IEC 13818-1 for program streams. The SCR (System Clock Reference) is a 27 MHz time base that denotes the system clock. A typical DVD player is a "pull" system, i.e., the MPEG decoder requests data from the front end as needed. Additionally, video packets contained in the payload portion include a video packet header which includes, inter alia, stream ID information, and optional PTS (Presentation Time Stamp) and DTS (Decoder Time Stamp) values.

Figure 5:
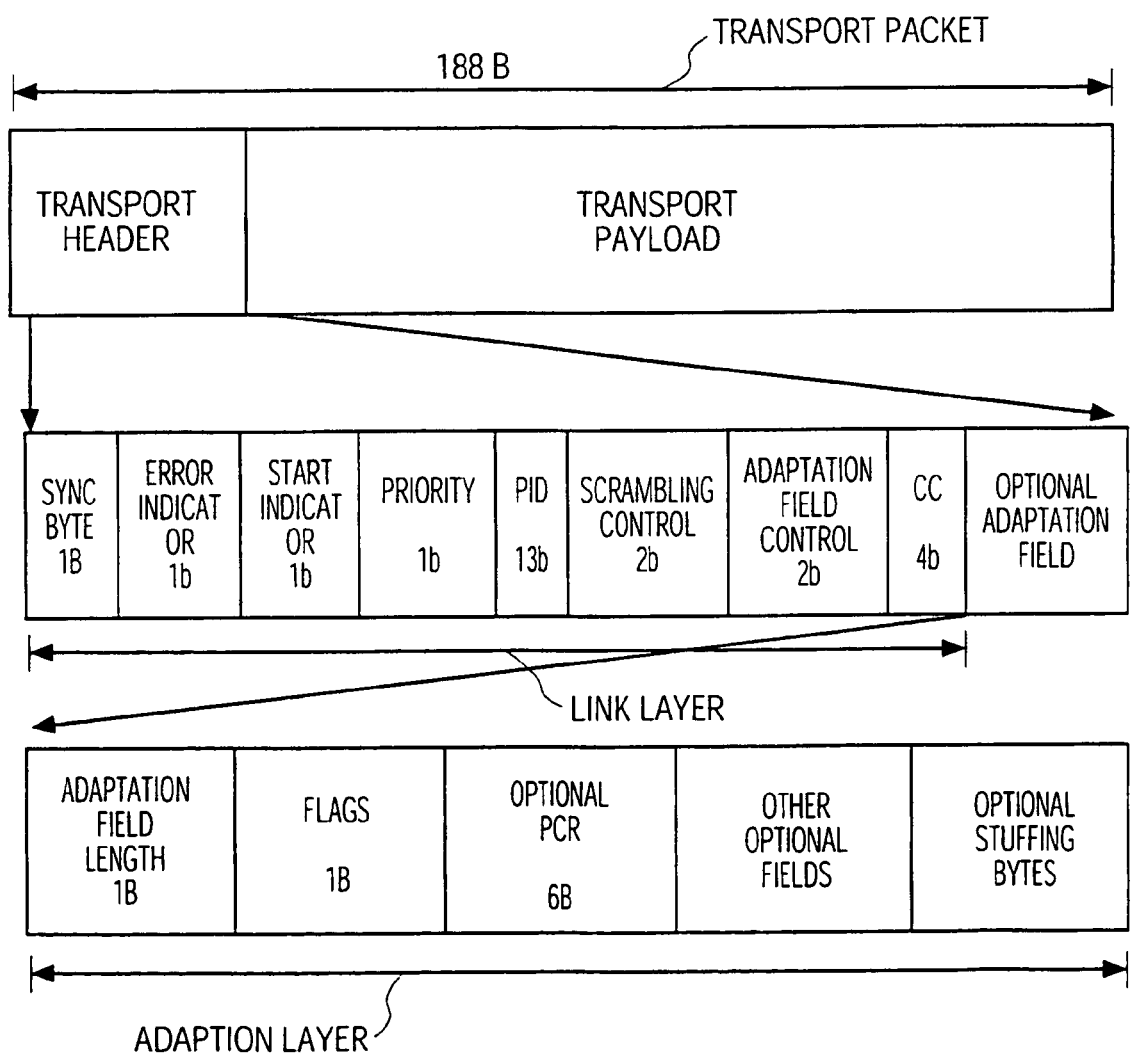
FIG. 5. is a diagram of a transport packet in accordance with the ATSC standard.

FIG. 5 illustrates the format of a transport packet according to the ATSC standard. The ATSC transport packets are based on the ISO/IEC 13818-1 Transport Stream format. This format encapsulates PES streams with a fixed 188 byte packet structure. Each transport packet includes a transport header, which includes a fixed-length link layer and a variable-length adaptation layer, and a transport payload portion. The transport header identifies the content of the payload portion. The payload data comprises a bit stream that is wrapped in a variable length packet (PES) structure. The ATSC standard has included constraints on this format such that pictures are packet aligned.

In contrast to the typical DVD player, the ATSC system is a "push" system, which relies on the encoder/transmitter to correctly model the receiver/decoder so that the decoder buffers are not corrupted. In other words, the encoder/transmitter is responsible for generating a synchronous bit stream. PCRs (Program Clock Reference) values are transmitted at a minimum rate of one every 100 mSec and synchronization at the receiver is accomplished by use of the PCR and PTS data. The PCR is used in a receiver to drive a PLL system, which recovers the 27 MHz system clock. In this case, the arrival time of the bits define the clock. The received DTS and PTS values are then used with this reference clock to determine decode and display timing.

The 8 VSB output of a HD DVD player described further below interfaces to a standard terrestrial input of an ATSC receiver. In this regard, the HD DVD player must provide 8 VSB encoded data that appears to the ATSC receiver as coming off the air. This implies that the outputted data must be formatted as ATSC transport streams. Unfortunately, current DVD discs store data as program stream packs as noted above. In this regard, a disc in accordance with the present invention stores the data in a unique format that enables the present HD DVD disc player to provide ATSC transport packets to an ATSC receiver using standard DVD player front end components and with little modification to the data read from the HD DVD disc.

In a HD DVD disc in accordance with the present invention, transport packets formatted in accordance with a DTV standard, in this case the ATSC standard, are mapped into the program stream packs of a DVD disc. More specifically, ATSC compliant transport packets are stored in the data payload portion of data packs formatted in accordance with the DVD specification. The same physical track size as normal DVD may be used to minimize changes to the front end of HD DVD player 100. However, the data structure at the pack level is changed to minimize differences between normal DVD formatted discs and HD DVD formatted discs. That is, the video object set (VOBS), video object (VOB), cell, and video object unit (VOBU) structure on a HD DVD formatted disc according to the present invention remains the same as a DVD standard compliant disc.

Figure 6A:
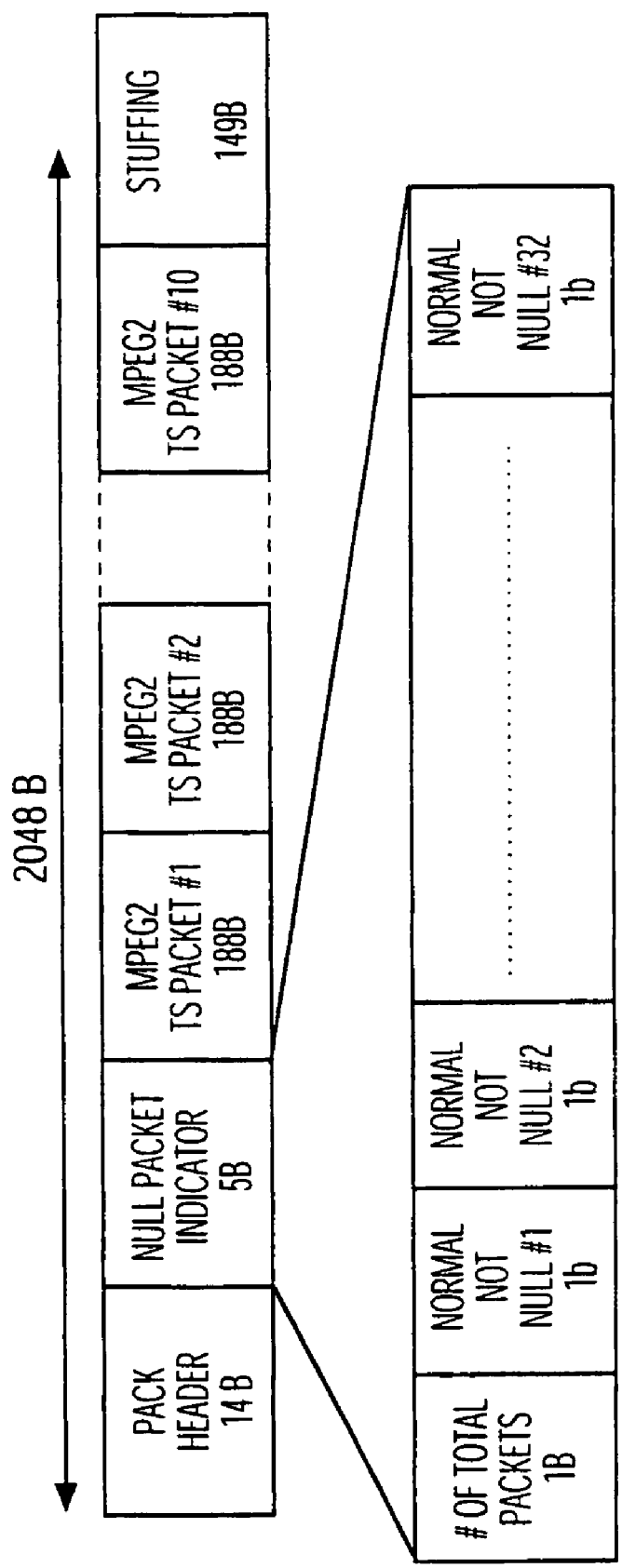
FIGS. 6a and 6b are diagrams of a data pack having transport packets mapped into the payload portion of the pack.
Figure 6B:
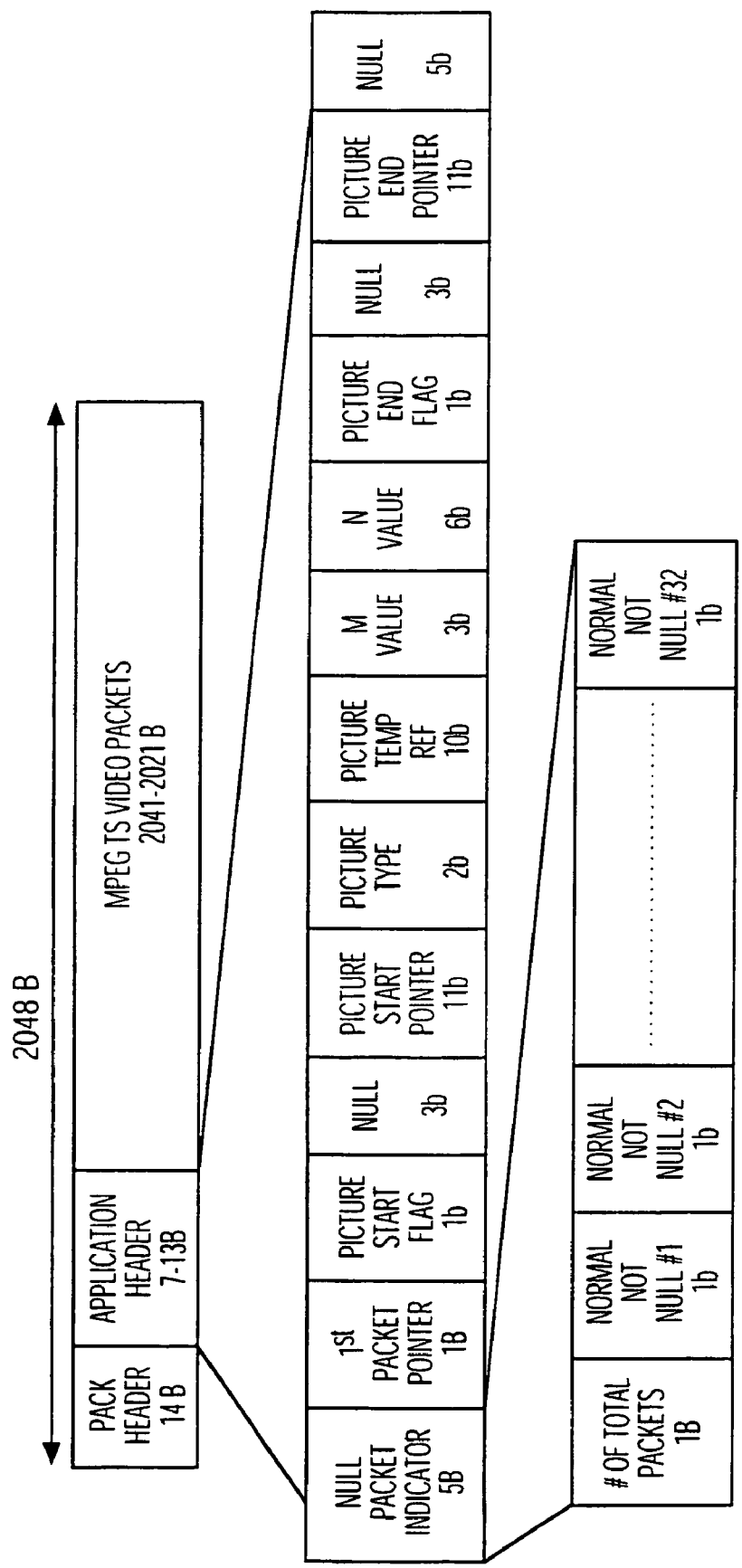

Arrangements whereby transport packets are mapped into the program stream packs are illustrated in FIGS. 6a and 6b. FIG. 6a shows an arrangement wherein the transport packets are sector aligned within the program stream packs. This data format includes a 14 byte pack header followed by a 5 byte null_packet_indicator field, which in turn is followed by 10 transport packets. The pack header format is the same as a normal DVD video pack header. Also, the packet header (PES layer) remains the same. However, in the present invention, the PES layer is also in the transport stream data. Therefore, the packet header may be ignored for HD DVD playback purposes. It is important to note that no modification is necessary to the transport packets read from the HD DVD disc. Also, no modifications are made to the format of the DVD data pack structure, except for the addition of the 5 byte null_packet_indicator field, which is described below.

The null_packet_indicator field is a new layer that is used for insertion of null packets for synchronization. Null packets must be inserted for synchronization to achieve the full ATSC 8 VSB transmission bandwidth of 19.4 Mbps. The format of a null packet is defined in the MPEG-2 standard. For each data pack, a bit stream multiplex of 10 ATSC transport packets will exist. The placement of the null packets will be determined in the packetizing software before the data is placed on the disc. The determination may be based on various factors, including, but not limited to, rate control algorithms used in specific MPEG encoders. This information is recorded in the null_packet_indicator field.

The number_of_total packets field indicates the total number of transport packets and null packets associated with that particular pack. Each bit in the normal_not_null field indicates the packet types within the pack There are 32 bits in the normal_not_null field. The sequence of 32 bits in this field defines the multiplexed order of transport packets and null packets. For example, if a "0" indicates a null packet, and the seventh bit in the field is a "0," the seventh packet in the multiplexed bit stream corresponds to a null packet. The bits in this field are left aligned.

When mapping the transport packets into the DVD data packs, it is desirable to fit as many transport packets inside a DVD data pack as possible. Assuming everything is replaced in the pack, the greatest integer number of transport packets that can be placed into a DVD data pack according to the arrangement of FIG. 6a is 10 (2048/188). Therefore, 149 bytes remain available for other data. In this case, the 149 byte space is filled with stuffing, i.e., data which has no meaning and no predetermined value, for example the byte 0xAA. The stuffing is not used by the DVD player. However, if only 10 transport packets were mapped for each DVD pack, then approximately 11.1% of the DVD disc capacity would be wasted.

A solution to the waste is to spread the transport packets across pack boundaries. However, spreading the transport packets across pack boundaries can create problems for insertion of null packets and trick modes, e.g., fast forward, because the locations of the anchor frames (I and P frames) needed to control and constitute trick modes cannot be quickly identified. Therefore, it is necessary to pack align frames that will be used as anchor frames for trick modes. In view of the above, it is advantageous to pack align the start of I frames and P frames, while allowing B frames to be spread between pack boundaries. Also, since the B frames are normally the most common types of frame in most GOP (group of pictures) structures, spreading B frames across pack boundaries increases the capacity efficiency.

FIG. 6b shows an alternative data arrangement wherein frames may be spread across pack boundaries. This arrangement includes a 7-13 byte application_header field, which can be used to enable trick modes as well as allow the spreading of frames across pack boundaries. The application_header layer gives a controller in the HD DVD player the ability to filter video data on a picture by picture basis without having to MPEG decode the bit stream. For example, if a fast forward is required, the controller will have knowledge of the GOP length and structure (I, P, B etc.) and can choose to form a new bit stream for an ATSC receiver to display. That is, a new bit stream can be formed that is ATSC compatible but performs a trick mode operation.

The syntax of the application header layer shown in FIG. 6b is now described. The null_packet_indicator field is similar to the null_packet_indicator field described above. However, in this case, the number of total packets denotes the total number of transport packets and null packets, not including any remainder of a previous packet at the beginning of the pack, but including the last packet of the pack, even if that last packet is a partial packet. The normal_not_null bits denote the status of the packets in the pack as described above, beginning with the first full packet. So if a partial packet is included at the beginning of the pack, the normal_not_null bits do not apply to that partial packet.

The first_packet_pointer denotes the location of the first byte of the first whole transport packet. The picture_start_flag indicates whether a picture start code is included in the present pack. If a picture start code is included, the picture_start_pointer points to the location of the picture start code. The picture_type field indicates the picture type (I, P, or B), and the picture_temporal_reference denotes the temporal frame of reference. The picture_end_flag bit indicates whether the present pack includes a picture end code. If a picture end code is included, the picture_end_pointer points to the location of the beginning of the transport packet associated with the last picture inside the pack. Alternatively, the picture_end_pointer may be set to point to the location of the last byte of the last picture in the pack. The M value minus one indicates the number of B frames between anchor frames. The N value indicates the number of frames per GOP. Therefore, using the application header information, a controller can quickly determine the location of various pictures as required during trick play mode.

Mapping the transport packets into the pack boundaries in the manner described above may result in some wasted capacity due to the unused payload space in the data pack immediately preceding an I frame or a P frame. The wasted capacity when B frames are spread across pack boundaries includes the following: an average of 44 bytes for PCR data within a transport stream packet_header; about 20 bytes for aligning the P and I frames to the pack boundary; and 7-13 bytes for the application_header. Therefore, compared to the normal bit stream payload of about 2020 bytes, the HD DVD disc having B frames spread across pack boundaries has a payload of about 1957 bytes (2034-44-20-13). This is a reduction of about 3% compared to normal DVD discs.

Trick mode operation is complicated by the separation between the video decoder and DVD player. That is, in a typical DVD player, the MPEG video decoder is in the same box as the DVD disk and playback control elements. Therefore, for trick modes, the video decoder in the DVD player can be controlled to skip pictures, start and stop decode, etc. However, in the present HD DVD player, the video decoder is disposed in the DTV receiver, which is external to the HD DVD player. Thus, the video decoder does not receive control commands from the HD DVD player. For example, if a user presses the fast-forward button on the HD DVD player, the video decoder in the DTV receiver knows nothing of this request.

To implement trick mode functions a legal MPEG bit stream must be formed that the DTV receiver recognizes as normal bit stream from the data on the HD DVD disk. The following modes can be supported, although a given HD DVD product could provide any subset of these functions.

To achieve fast forward modes having different speeds, the M and N values of the GOPs (M−1 indicates the number of B frames between anchor frames, N indicates the number of frames per GOP) are used to determine how long each I frame should be repeated. For example, if N=12, to achieve 3× speed the I frame will be repeated in the bit stream 4 times. Note that the temporal reference must be changed to 0 (if not 0 already) in order for the HDTV receiver MPEG decoder to properly repeat the frame. Also, the same I frame can not be repeatedly sent across the channel because the bit buffer of the decoder would likely overflow (generally I frames are the largest compressed frames in MPEG streams). Therefore, in order to "repeat" the I frame the present HD DVD player inserts dummy P frames which have motion vectors equal to 0. These P frames would be very small and would not overflow the DTV decoder bit buffer.

With regard to fast reverse, I frame mode is similar to fast forward. In this case the present HD DVD player searches for I frames in reverse order and then performs the same functions as discussed above for fast forward. It would also be possible to reverse the temporal_reference number in the picture header. A decoder designed to place decoded pictures in temporal reference order would reverse the play of the pictures.

The implementation of the slow forward and slow reverse functions in the present HD DVD player are also different than these functions in a conventional DVD player. When a conventional DVD player performs a slow forward playback, the MPEG decoder in the DVD player is controlled to display each individual frame for longer than a frame time. For example, to implement 1/3 speed, each frame is displayed for 3 frame periods.

However, in the present HD DVD player, since the player does not have access to the MPEG decoder, the player repeats frames across the channel in order to slow down the display speed. The I frames cannot be repeated without overflowing the buffer, therefore the present player inserts dummy P frames with zero motion vectors. Also, B frames cannot be repeated if dummy P frames are being inserted. For example, for a typical bit stream with M=3 the following steps would be performed for 1/3 display rate: an I frame is transmitted to the MPEG decoder; 8 dummy P frames are transmitted with temporal reference numbers 1-8; a real P frame is transmitted with altered temporal reference number 9; 8 dummy P frames are transmitted with temporal reference numbers 10-17; and the process continues with P frames.

Figure 2:
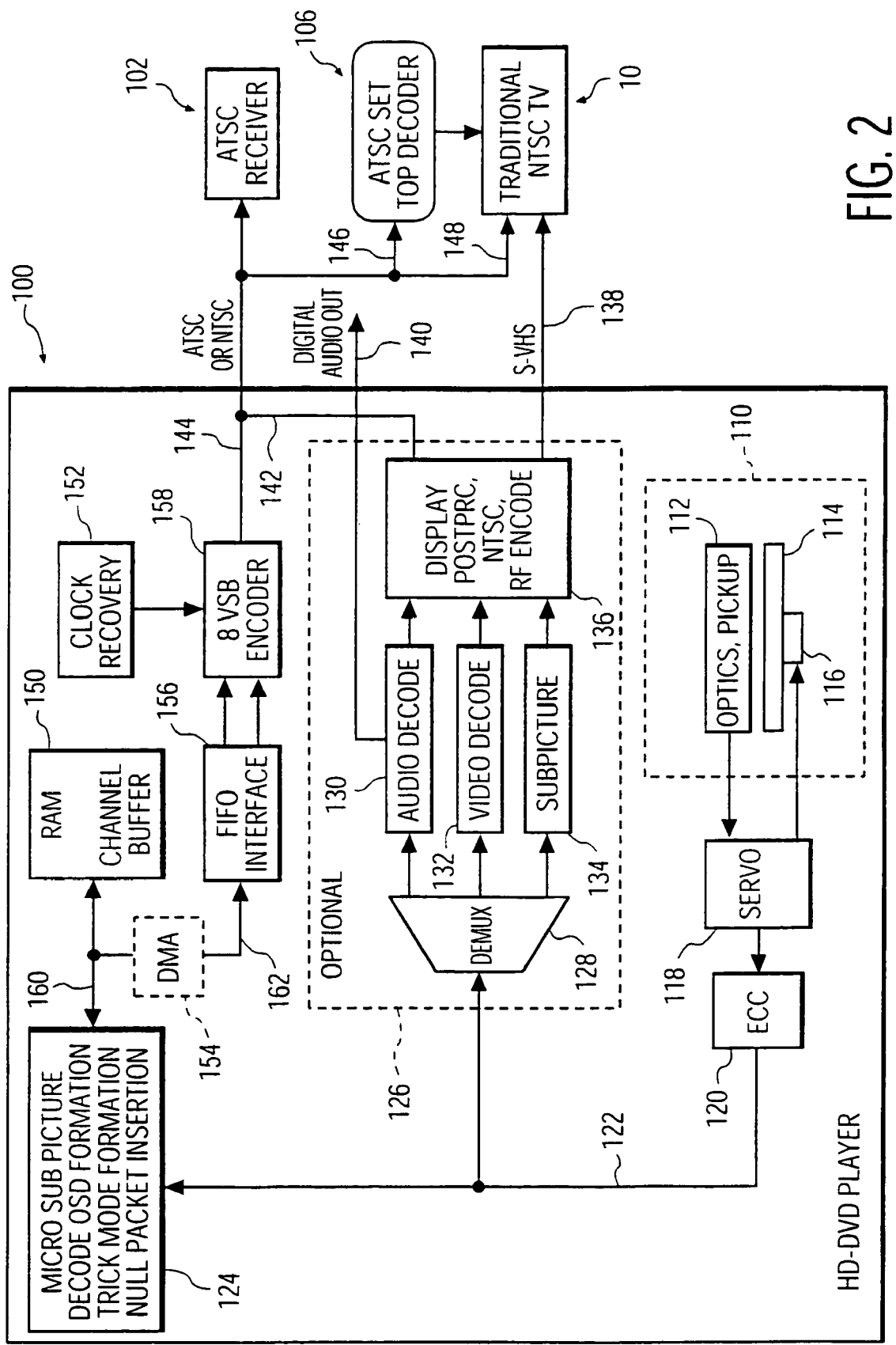
FIG. 2 is a block diagram of a HD DVD player in accordance with the present invention, wherein the HD DVD player is capable of providing an output signal that complies with a digital television standard, such as the ATSC standard.

A HD DVD player suitable for use with the HD DVD formatted disc described above is now described. FIG. 2 illustrates a block diagram of an exemplary HD DVD player 100 in accordance with the present invention. In block 110 a deck is shown which may accept a digitally recorded disc 114 for rotation by a motor 116. A digital signal is recorded on disc 114 as a spiral track containing pits with respective pit lengths determined by an 8/16 modulation coding responsive to respective signal data bits. The signals recorded on disc 114 is read by pick up 112 which gathers reflected illumination from a laser. The reflected laser light is collected by a photo detector or opto pick-up device. An imaging device, for example a lens or mirror, which forms part of transducer pick-up 112, is servo controlled and driven by a motor to follow the recorded track. Different parts of the recording may be accessed by rapidly repositioning the imaging device. Servo controlled motor 116 is driven by servo driver 118. Pick up 112 is coupled to an opto preamplifier (not shown), which includes drive circuitry for the laser illuminator and a preamplifier which provides amplification and equalization for the reflected signal output from the opto pick-up device.

The amplified and equalized signal from the opto preamplifier is connected to ECC block 120. The MPEG encoded bit stream is encoded for error detection and correction by means of Reed Solomon product coding which is applied in blocks of 16 sectors, wherein each sector contains 2048 bytes of data. Following 8:16 demodulation the data stream is de-interleaved or unshuffled and error corrected by means of Reed Solomon product correction implemented in ECC block 120, which typically includes various buffer memories. Each buffer stores 16 sectors of the replay data stream arranged as an array to facilitate de-interleaving and to enable the required row and column product processing.

Figure 1:
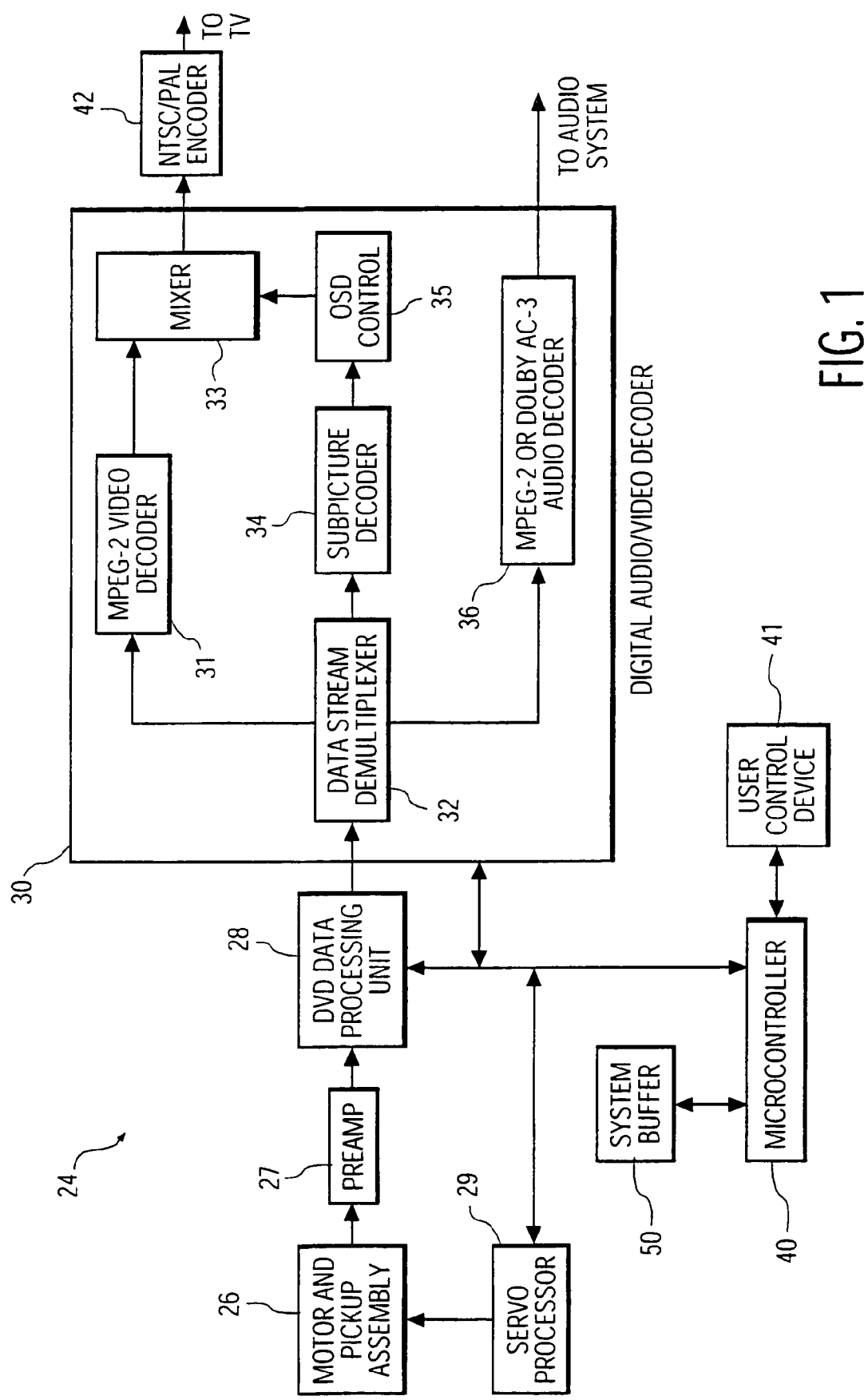
FIG. 1 is a block diagram of a digital video disc player that provides an output signal that complies with the NTSC or PAL standard.

Disc player 100 includes analog processing portion 126 which receives the error corrected bit stream from ECC block 120 and provides analog output signals to NTSC receiver 104 or ATSC receiver 102 via outputs 138 and output 140, respectively. Analog processing portion 126 performs functions similar to that of audio/video decoder 30 of FIG. 1. Analog processing portion 126 includes demultiplexer 128 which separates the bit stream into video, audio, and sub-picture bit streams, which are decompressed and decoded by respective one of audio decoder 130, video decoder 132 and sub-picture decoder 134. Display processor 136 performs the various functions associated with formatting the decompressed and decoded data, including D/A conversion, signal mixing, and RF encoding.

The various components of analog processing portion 126 operate under the control of control unit 124. Control unit 124 comprises any element, or group of elements, that may be designed or programmed to control the various elements of HD DVD player 100. Control unit 124 may be embodied in an integrated circuit, including, but not limited to STI 5520 manufactured by ST Microelectronics. Control unit 124 may incorporate various elements for controlling the data flow in disc player 10, including, a link processor for controlling the flow of the error corrected bit stream from ECC block 120 to channel buffer 150, an MPEG video or audio decoder, a transport processor and a microprocessor. Control unit 124 also accepts the reproduced bit stream and error flags from ECC block 120 and provides control instructions to servo driver 118. In addition control unit 124 accepts user control commands from a user interface block (not shown), and MPEG decoder control functions from decoder elements 130, 132 and 134.

The error corrected signal bit stream from ECC 120 is also coupled, via the link processor of control unit 124, to channel buffer memory 150. Channel buffer memory 150 advantageously comprises a DRAM memory type and is used to store an amount of replayed data such that data losses during transducer or pickup 112 repositioning will not result in any visible deficiency when decoded. Thus the final output image stream will appear to be continuous or seamless to the viewer. Data may be intermittently written to channel buffer 150 as a consequence of changes in replay track addresses, for example, resulting from user defined replay video content such as a "Directors cut", parental guidance selection, or even user selectable alternative shot angles. To facilitate more rapid access and recovery of the recorded signal, disc 114 may be rotated at an increased speed resulting in the transduced bit stream having a higher bit rate, and possibly intermittent delivery.

Control unit 124 controls the transfer of data stored in buffer 150, via DMA, to FIFO interface 156 as necessary. The data stored in channel buffer 150 is the error corrected bit stream, which is formatted according to the DVD specification, from ECC block 120. During data transfer, control unit 124 removes the header information bytes from the DVD formatted packs, adds the necessary null packets and sends the combined bit stream of transport packets and null packets to FIFO interface 156. Thus, channel buffer 150 contains DVD formatted packs while FIFO interface 156 contains ATSC transport packets and null packets. Data is transferred from FIFO interface 156 to 8 VSB encoder 158 at a constant bit rate.

Control unit 124 transfers data to FIFO interface 156 as necessary to maintain the occupancy state of FIFO interface 156 at a predetermined desired level. The size and the desired occupancy level of FIFO interface 156 is designed to support the characteristics of the DMA channel and the bit rate of 8 VSB encoder 158. That is, it must be large enough to handle the DMA bursts from control unit 124 and the maximum delay between the DMA bursts. The data is sent from FIFO interface 156 to 8 VSB encoder 158, which encodes the output bit stream in accordance with the ATSC standard. FIFO interface 156 provides an asynchronous interface between the DMA clock and the 8 VSB encoder clock. Data bursts are sent from channel buffer 150 to maintain the necessary occupancy of FIFO interface 156, and FIFO interface 156 sends the required constant data stream to 8 VSB encoder 158.

The operation of HD DVD player 100 in reading program stream packs from a HD DVD disc and providing ATSC compliant output signals is now described. As data is read from disc 114, the PCR values in the transport stream headers are recovered and used to drive a local PLL circuit to time the delivery of data to 8 VSB encoder 158 and therefore to ATSC receiver 102. The transport multiplex of the transport stream data is maintained in software by encoding the location of null packets on disc 114. Therefore, the software encoder must maintain an ideal PCR clock in order for buffer maintenance.

When a particular data pack or group of data packs are read from disc 114 into channel buffer 150, control unit 124 reads the null_packet_indicator field to determine how many total ATSC packets must be sent for the particular data pack or group of data packs. For example, if the number of total packets equals 15, then 5 of the packets must be null packets. Control unit 124 determines when to insert these 5 null packets by examining the first 15 bits of the normal_not_null field of the header. These bits represent the order of packets within the sector. If the bit is a 1 then control unit 124 sends the next available transport packet. If the bit is a 0, then control unit 124 sends a null packet, which is stored in DRAM. The format of a null packet is defined in the MPEG-2 standard. This sequence continues until 15 packets have been sent for the current data pack, or sector. The remaining 17 bits (32-15) of the normal_not_null bits field are ignored. Therefore, up to a total of 32 packets can be sent per data pack. In the extreme case, 22 null packets and 10 ATSC transport packets would be sent.

If the data format is in accordance with FIG. 6a, controller 124 recognizes that the data format in the payload portion following the null_packet_indicator is always the same, namely 10 transport packets followed by a 149 byte stuffing portion. With regard to this data format, controller 124 can be easily programmed to properly format the data being transferred from channel buffer 150 to FIFO interface 156 by transferring the 10 transport packets and removing the stuffing portion. This is a relatively simple matter because controller 124 knows where the transport packets and the stuffing portion are always located. The data sent to FIFO interface 156 is comprised of a contiguous stream of transport packets and null packets.

If the data format is in accordance with FIG. 6b, controller 124 recognizes that the data format in the payload portion following the null_packet_indicator may include partial transport packets, either at the beginning or the end of the pack. In this case, controller 124 examines the picture end flag and the picture end pointer to determine whether the pack includes an end picture (end of a B frame prior to an I frame or a P frame), and if so, its location. If the pack does not include a picture end, controller 124 recognizes that the payload portion of the pack is entirely comprised of transport packets and transfers the contents, including the partial transport packets to FIFO interface 156. However, if the pack does include a picture end, controller 124 recognizes that the payload portion includes a stuffing portion immediately following the transport packet associated with the last picture, which stuffing portion must be removed during transfer to FIFO interface 156. In this regard, controller 124 determines from the picture end pointer the location of the transport packet associated with the last picture, and transfers the transport packets up to and including that transport packet. Controller 124 then examines the next data pack to determine which portion of the data payload should be transferred to FIFO interface 156. In this manner, the stuffing portions in the data packs are eliminated.

Figure 7:
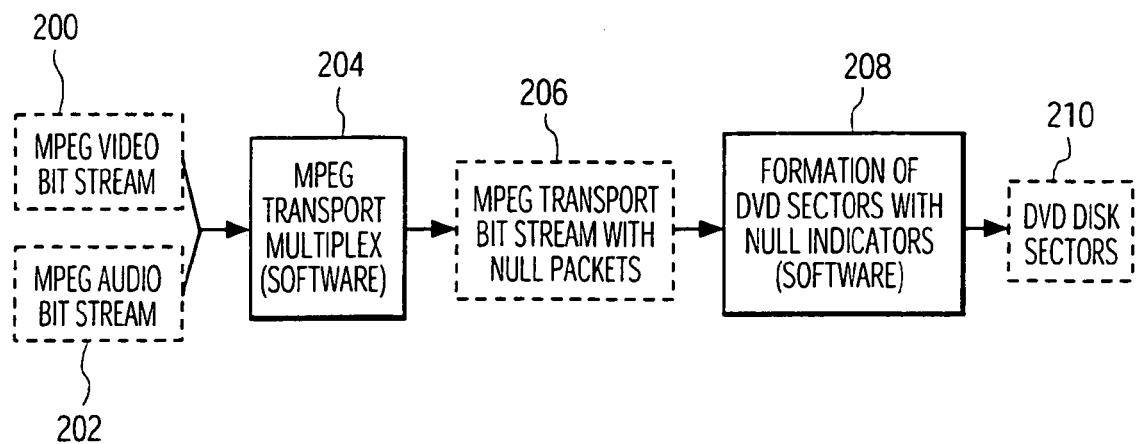
FIG. 7 is a flow diagram illustrating the steps for generating and placing data onto a DVD disc, which data may be used to provide a DTV signal.

FIG. 7 illustrates the steps associated with generating data that is suitable for storage on a HD DVD disc from a source material. In steps 200 and 202, an MPEG video bit stream and an MPEG audio bit stream are generated from the source material. In step 204, the MPEG video and MPEG audio bit streams are multiplexed to form a program stream. In step 206, the multiplexed bit stream is converted to a transport stream comprised of transport packets in accordance with the ATSC standard and null packets. In step 206, the transport stream is mapped into data packs that conform to the DVD specification, and null_packet_indicators are added. In step 210, the data packs containing the transport packets and the null packet information is stored on a DVD disc using the conventionally known methods.

Figure 8:
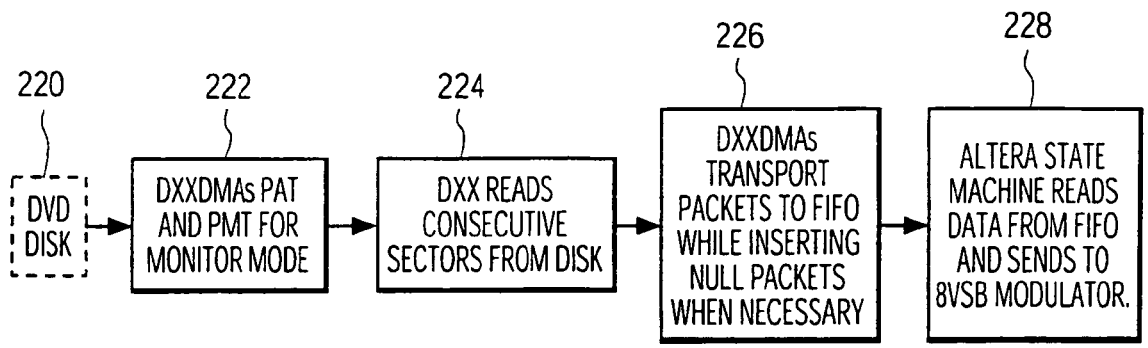
FIG. 8 is a flow diagram illustrating the steps of reading data in accordance with the present invention from a DVD disc and providing a DTV signal.

FIG. 8 illustrates the steps associated with reading data generated according to steps 200-210 above and providing ATSC data suitable for processing in a ATSC receiver. In step 220, data is read from the HD DVD disc using an optical pickup and associated components in a conventional manner. In step 222, control unit 124 DMAs the program association table (PAT) and the program map table (PMT) for monitor mode. As is known, the PAT and PMT define the structure of the bit stream to the ATSC receiver. The ATSC receiver looks at the PAT and the PMT information to determine which packet IDs (PIDs) are used for which channels. The monitor mode is an ATSC specified mode for PAT/PMT table to allow an ATSC receiver to tune to a fixed channel, i.e., a DVD player. In step 224, control unit 124 reads consecutive sectors from the DVD disc. In step 226, control unit 124 transfers the transport packets to FIFO interface 156 while inserting null packets as necessary. In step 228, a FIFO controller, generates read and write signals to FIFO interface 156 and 8 VSB encoder 158 in order to send the required data from FIFO interface 156 to 8 VSB encoder 158. 8 VSB encoder 158 encodes the transport packets per the ATSC transmission standard including data randomizing, Reed-Solomon encoding, trellis encoding, and VSB modulation.

It will be apparent to those skilled in the art that although the present invention has been described in terms of an exemplary embodiment, modifications and changes may be made to the disclosed embodiment without departing from the essence of the invention. For example, although the data format according to the present invention includes transport packets in accordance with the ATSC standard, it is clear that other DTV standards that utilize packetized data streams may be utilized. Also, although the present invention utilizes optical discs having a substrate disposed thereon, wherein a data track is disposed on the substrate, it is clear that other suitable data storage medium, including, but not limited to, hard disc drives, flash memory cards, and floppy discs may be utilized. Therefore, it is to be understood that the present invention is intended to cover all modifications as would fall within the true scope and spirit of the present invention.

The invention claimed is:

1. A data storage element having data stored thereon, the data being readable and processed by a reader device, comprising:
   a substrate; and
   a data track disposed on the substrate, the data track comprising a plurality of data sectors read by the reader device coupled to the storage element, each of the data sectors being formatted in accordance with a first digital data standard and comprised of a control data portion and a payload data portion, each of the payload data portions including a plurality of data packets that represent a video program adapted to be decoded by the reader device in accordance with a digital television standard to generate an output signal, wherein
   each payload data portion further includes an application header that has control information that is read and used by the reader device to allow the reader device to filter the plurality of data packets in the payload data portion on a picture by picture basis without decoding the video data in the plurality of data packets.

2. The data storage element according to claim 1, wherein each data sector corresponds to a program stream pack formatted in accordance with the DVD standard and the data packets correspond to ATSC compliant transport packets.

3. The data storage element according to claim 1, wherein the payload data portions further include a plurality of null packets that are inserted to ensure that an output bitstream generated using the plurality of data packets corresponds to a bitrate required by the digital television standard.

4. The data storage element according to claim 3, wherein the output bitstream generated using the plurality of data packets and null packets results in an 8 VSB transmission at 19.4 Mbps.

5. The data storage element according to claim 3, wherein each control data portion includes an in indicator field that includes data that enables the reader device to recognize the total number of transport packets contained in the respective data sector and whether each data packet is a null packet or a transport packet formatted in accordance with the digital television standard.

6. The data storage element according to claim 3, wherein the data sectors include a non-integer number of transport packets.

7. The data storage element according to claim 3, wherein the payload data portion includes an integer number of transport packets associated with I and P frames in accordance with the MPEG-2 standard.

8. The data storage element according to claim 3, wherein the application header includes a pointer that enables the reader device to recognize the location of the first whole transport packet in the program stream pack.

9. The data storage element according to claim 3, wherein the application header includes a flag that enables the reader device to recognize whether a transport packet associated with a picture start is contained in the program stream pack, and a second pointer that enables the reader device to recognize the location of the transport packet associated with the picture start in the program stream pack.

10. The data storage element according to claim 3, wherein the application header includes a second flag that enables the reader device to recognize whether a second transport packet associated with a picture end is contained in the program stream pack, and a third pointer that enables the reader device to recognize the location of the transport packet associated with the picture end in the programs stream pack.

11. The data storage element according to claim 3, wherein the application header includes a first value that enables the reader device to recognize the number of B frames between anchor frames and a second value that enables the reader device to recognize the number of frames in a group of pictures.

12. An apparatus, comprising:
a source of a digital bit stream, the bit stream comprising a plurality of data packs, each data pack formatted in accordance with a first digital data standard and comprised of a control data portion and a payload data portion, each of the payload data portions including a plurality of data packets formatted in accordance with a digital television standard;
an encoder adapted to transmit an output signal in accordance with the digital television standard; and
a control unit coupled to the source and the encoder, the control unit receiving the digital bit stream from the source and transferring a second bit stream comprised of a plurality of the data packets that are compliant with the digital television standard to the encoder, wherein
each payload data portion further includes an application header having control information and the control unit is adapted to filter the plurality of data packets in the payload data portion on a picture by picture basis without decoding the video data in the plurality of data packets in response to the control information in the application header.

13. The apparatus according to claim 12, wherein each data pack corresponds to a program stream pack formatted in accordance with the DVD standard and the data packet correspond to ATSC compliant transport packets.

14. The apparatus according to claim 13, wherein the encoder comprises an 8 VSB encoder, and wherein the control unit recovers clock information from the digital bit stream to synchronize the operation of the 8 VSB encoder.

15. The apparatus according to claim 13, further comprising an analog processing portion that processes the digital bit stream and provides a video signal (NTSC, S-VHS) that compiles with an analog television standard.

16. The apparatus according to claim 12, wherein the control unit inserts a plurality of null packets to the second bit stream to ensure that an output bit stream generated in response to the second bit stream corresponds to a bitrate required by the digital television standard.

17. The apparatus according to claim 12, wherein each application header includes an indicator field that includes data indicative of the total number of data packets associated with the respective payload data portion and whether each data packet is a transport packet or a null packet, the control unit inserting null packets formatted in accordance with the MPEG-2 standard in the second bit stream in response to the indicator field.

18. The apparatus according to claim 12, wherein each data pack includes an integer number of transport packets associated with I and P frames in accordance with the MPEG-2 standard, whereby the control unit is able to determine the location of I and P frames in the bit stream in response to control information in the application header.

19. The apparatus according to claim 12, wherein the application header includes a pointer indicative of the location of the first whole transport packet in the respective data pack, the control unit determining the location of the first whole transport packet in the respective data pack in response to the pointer.

20. The apparatus according to claim 16, wherein the application header includes a flag indicative of whether a transport packet associated with a picture start is contained in the respective data pack, and a pointer indicative of the location of the transport packet associated with the picture start in the respective data pack.

21. The apparatus according to claim 12, wherein the application header includes a second flag indicative of whether a transport packet associated with a picture end is contained in the respective data pack, and a second pointer indicative of the location of the transport packet associated with the picture end in the respective data pack.

22. A method for transmitting a digital video signal, comprising the steps of:
receiving a digital bit stream comprising a plurality of data packs, each data pack formatted in accordance with a first digital standard and comprised of a control data portion and a payload data portion, each of the payload data portions including a plurality of data packets formatted in accordance with a digital television standard;
extracting the plurality of data packets from the digital bit stream and generating a second bit stream; and
providing an output signal encoded in a accordance with the digital television standard in response to the second bit stream, wherein
each payload data portion further includes an application header having control information and
filtering the plurality of data packets in the payload data portion on a picture by picture basis without decoding the video data in the plurality of data packets in response to the control information in the application header.

23. The method according to claim 22, wherein each data pack corresponds to a program stream pack in accordance with the DVD standard and the data packets correspond to ATSC compliant transport packets.

24. The method according to claim 23, further comprising the step of recovering clock information from the digital data stream to synchronize the operation of an 8 VSB encoder.

25. The method according to claim 23, further comprising the step of processing the digital it stream and providing a video signal that complies with an analog television standard.

26. The method according to claim 22, further comprising the step of inserting null packets to the second bit stream to ensure that an output bit stream generated in response to the second bit stream corresponds to a bitrate required by the digital television standard.

27. The method according to claim 22, further comprising the steps of evaluating an indicate in the application header to determine the total number of data packets associated with the respective payload data portion and whether each data packet is transport packet or a null packet, and inserting null packets formatted in accordance with the MPEG-2 standard in the second bit stream in response to the data in the indicator field.

28. The method according to claim 22, further comprising the step of determining the location of I and P frames in the bit stream in response to control information in the application header.

29. The method according to claim 22, further comprising the steps of evaluating a pointer in the application header to determine the location of the first whole transport packet in the respective data pack.

30. The method according to claim 22, further comprising the step of evaluating a flag in the application header to determine whether a transport packet associated with picture start is contained in the respective data pack, and a pointer in the application header to determine the location of the transport packet associated with the picture start in the respective data pack.

31. The method according to claim 22, further comprising the step of evaluating a second flag in the application header to determine whether a transport packet associated with a picture end is contained in the respective data pack, and a second pointer in the application header to determine the location of the transport packet associated with the picture end in the respective data pack.

32. A method for transmitting a digital video signal, comprising the steps of:

receiving a digital bit stream comprising a plurality of data packs, each data pack formatted in accordance with a first digital standard and comprised of a control data portion and a payload data portion, each of the payload data portions including a plurality of transport packets;

extracting the plurality of transport packets from the digital bit stream and transmitting an output signal formatted in accordance with a digital television standard with the plurality of transport packets, wherein, each payload data portion further includes an application header portion, and filtering the plurality of transport packets in the payload data portion on a picture by picture basis without decoding video data in the plurality of transport packets in response to the application header portion.

33. The method according to claim 32, wherein the payload data portion includes null packets, and further comprising the step of determining the number of transport packets and the number of null packets in a particular payload data portion in response to the application header portion.

34. The method according to claim 32, further comprising the step of locating a start of the plurality of transport packets and null packets within the payload data portion in response to the application header portion.

* * * * *